(12) United States Patent
Dion et al.

(10) Patent No.: US 12,045,855 B2
(45) Date of Patent: *Jul. 23, 2024

(54) SYSTEMS AND/OR METHODS FOR DISTRIBUTING ADVERTISEMENTS FROM A CENTRAL ADVERTISEMENT NETWORK TO A PERIPHERAL DEVICE VIA A LOCAL ADVERTISEMENT SERVER

(71) Applicant: TouchTunes Music Company, LLC, New York, NY (US)

(72) Inventors: Dominique Dion, Verdun Nun's Island (CA); Michael Tooker, Pointe Claire (CA); Francois Guy, Montreal (CA); Mounir Khenfir, Montreal (CA)

(73) Assignee: TOUCHTUNES MUSIC COMPANY, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,448

(22) Filed: Nov. 11, 2022

(65) Prior Publication Data

US 2023/0073899 A1 Mar. 9, 2023

Related U.S. Application Data

(63) Continuation of application No. 17/011,719, filed on Sep. 3, 2020, now Pat. No. 11,501,333, which is a
(Continued)

(51) Int. Cl.
*G06Q 30/02* (2023.01)
*G06Q 30/0251* (2023.01)
(Continued)

(52) U.S. Cl.
CPC ......... *G06Q 30/0251* (2013.01); *G06Q 30/02* (2013.01); *H04H 20/103* (2013.01);
(Continued)

(58) Field of Classification Search
None
See application file for complete search history.

(56) References Cited

U.S. PATENT DOCUMENTS 3,807,541 A 4/1974 Kortenhaus
3,982,620 A 9/1976 Kotenhaus
(Continued)

FOREIGN PATENT DOCUMENTS

AU 199954012 4/2000
CN 1340939 3/2002
(Continued)

OTHER PUBLICATIONS

Canadian Office Action Application No. 2, 881,533 mailed Aug. 30, 2016.
(Continued)

*Primary Examiner* — Vincent M Cao
(74) *Attorney, Agent, or Firm* — Nixon & Vanderhye, PC

(57) ABSTRACT

Certain exemplary embodiments disclosed herein relate to systems and/or methods for distributing advertisements from a central advertisement network to one or more peripheral devices at a location via a local advertisement server. In certain exemplary embodiments, the local advertisement server within a location receives advertisements from the central advertisement network and rebroadcasts them to peripheral devices within that location. Advertising information may be tracked and reported, e.g., for accounting, revenue-sharing, and/or other purposes in certain exemplary embodiments. Thus, in certain exemplary embodiments, the distribution of advertisements is provided to peripherals via a non-web- and non-PC-dependent network. Moreover, in certain exemplary embodiments, reporting and advertising related communications are substantially bi-directional regardless of device type. Certain exemplary embodiments provide revenue sharing among some or all of the central
(Continued)

advertising network provider, the proprietors of locations, operators tasked with maintaining the local ad server and/or the peripheral devices, etc.

16 Claims, 11 Drawing Sheets

Related U.S. Application Data continuation of application No. 15/959,889, filed on Apr. 23, 2018, now Pat. No. 10,776,820, which is a continuation of application No. 14/277,404, filed on May 14, 2014, now Pat. No. 9,953,341, which is a continuation of application No. 13/670,553, filed on Nov. 7, 2012, now Pat. No. 8,739,206, which is a continuation of application No. 12/318,864, filed on Jan. 9, 2009, now Pat. No. 8,332,887.

(60) Provisional application No. 61/006,382, filed on Jan. 10, 2008.

(51) Int. Cl.
*H04H 20/10* (2008.01)
*H04N 7/173* (2011.01)
*H04N 21/214* (2011.01)
*H04N 21/222* (2011.01)
*H04N 21/2543* (2011.01)
*H04N 21/442* (2011.01)
*H04N 21/658* (2011.01)
*H04N 21/81* (2011.01)
*H04N 21/433* (2011.01)
*H04N 21/472* (2011.01)

(52) U.S. Cl.
CPC ..... *H04N 7/17318* (2013.01); *H04N 21/2143* (2013.01); *H04N 21/222* (2013.01); *H04N 21/2543* (2013.01); *H04N 21/44224* (2020.08); *H04N 21/6582* (2013.01); *H04N 21/812* (2013.01); *H04N 21/4331* (2013.01); *H04N 21/47202* (2013.01)

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |

(56) References Cited

U.S. PATENT DOCUMENTS

| | | |
|---|---|---|
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |

(56) References Cited

U.S. PATENT DOCUMENTS

| | | |
|---|---|---|
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |

(56) References Cited

U.S. PATENT DOCUMENTS

| | | |
|---|---|---|
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,548,851 B1 | 6/2009 | Lau |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| D642,553 S | 8/2011 | Nathan et al. |
| 7,992,178 B1 | 8/2011 | Nathan et al. |
| 7,996,873 B1 | 8/2011 | Nathan et al. |
| 8,015,200 B2 | 9/2011 | Seiflien et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| 8,214,874 B2 | 7/2012 | Nathan |
| D665,375 S | 8/2012 | Garneau et al. |
| 8,292,712 B2 | 10/2012 | Nathan et al. |
| 8,332,895 B2 | 12/2012 | Nathan et al. |
| 8,429,530 B2 | 4/2013 | Neuman |
| 2001/0016815 A1 | 8/2001 | Takahashi et al. |
| 2001/0023403 A1 | 9/2001 | Martin |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0045960 A1 | 4/2002 | Phillips |
| 2002/0113824 A1 | 8/2002 | Myers |
| 2002/0116476 A1 | 8/2002 | Eyal et al. |
| 2002/0118949 A1 | 8/2002 | Jones |
| 2002/0120925 A1 | 8/2002 | Logan |
| 2002/0123331 A1 | 9/2002 | Lehaff et al. |
| 2002/0129036 A1 | 9/2002 | Ho Yuen Lok et al. |
| 2002/0129371 A1 | 9/2002 | Emura et al. |
| 2002/0144283 A1 | 10/2002 | Headings |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith |
| 2003/0008703 A1 | 1/2003 | Gauselmann |
| 2003/0018740 A1 | 1/2003 | Sonoda |
| 2003/0027120 A1 | 2/2003 | Jean |
| 2003/0031096 A1 | 2/2003 | Nathan et al. |
| 2003/0041093 A1 | 2/2003 | Yamane |

(56) References Cited

U.S. PATENT DOCUMENTS

| | | |
|---|---|---|
| 2003/0065639 A1 | 4/2003 | Fiennes |
| 2003/0076380 A1 | 4/2003 | Yusef et al. |
| 2003/0088538 A1 | 5/2003 | Ballard |
| 2003/0093790 A1 | 5/2003 | Logan |
| 2003/0101450 A1 | 5/2003 | Davidsson et al. |
| 2003/0104865 A1 | 6/2003 | Itkis et al. |
| 2003/0108164 A1 | 6/2003 | Laurin |
| 2003/0135424 A1 | 7/2003 | Davis |
| 2003/0144910 A1 | 7/2003 | Flaherty et al. |
| 2003/0163388 A1 | 8/2003 | Beane |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee |
| 2003/0233469 A1 | 12/2003 | Knowlson |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0148362 A1 | 7/2004 | Friedman |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0034084 A1 | 2/2005 | Ohtsuki |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0240661 A1 | 10/2005 | Heller et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0002570 A1 | 2/2007 | Kawasaki et al. |
| 2007/0086280 A1 | 4/2007 | Cappello |
| 2007/0101365 A1 | 5/2007 | Clark |
| 2007/0121430 A1 | 5/2007 | Nathan |
| 2007/0139410 A1 | 6/2007 | Abe et al. |
| 2007/0142022 A1 | 6/2007 | Madonna |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0220580 A1 | 9/2007 | Putterman |
| 2007/0247979 A1 | 10/2007 | Brillon et al. |
| 2008/0005698 A1 | 1/2008 | Koskinen |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu |
| 2008/0239887 A1 | 10/2008 | Tooker et al. |
| 2008/0305738 A1 | 12/2008 | Khedouri |
| 2009/0006993 A1 | 1/2009 | Tuli et al. |
| 2009/0030802 A1 | 1/2009 | Plotnick |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0109224 A1 | 4/2009 | Sakurai |
| 2009/0128631 A1 | 5/2009 | Ortiz |
| 2009/0138111 A1 | 5/2009 | Mastronardi |
| 2009/0158203 A1 | 6/2009 | Kerr et al. |
| 2009/0172565 A1 | 7/2009 | Jackson et al. |
| 2009/0177301 A1 | 7/2009 | Hayes |
| 2009/0234914 A1 | 9/2009 | Mikkelsen et al. |
| 2009/0241061 A1 | 9/2009 | Asai et al. |
| 2009/0287696 A1 | 9/2009 | Asai |
| 2009/0265734 A1 | 10/2009 | Dion et al. |
| 2009/0282491 A1 | 11/2009 | Nathan |
| 2009/0307314 A1 | 12/2009 | Smith |
| 2010/0042505 A1 | 2/2010 | Straus |
| 2010/0111489 A1 | 5/2010 | Presler |
| 2010/0211818 A1 | 8/2010 | Nathan et al. |
| 2010/0211872 A1 | 8/2010 | Rolston |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2011/0066943 A1 | 3/2011 | Brillon et al. |
| 2011/0246517 A1 | 10/2011 | Nathan et al. |
| 2011/0270894 A1 | 11/2011 | Mastronardi et al. |
| 2011/0283236 A1 | 11/2011 | Beaumier et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |

FOREIGN PATENT DOCUMENTS

| | | |
|---|---|---|
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 B1 | 4/1993 |
| EP | 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 | 5/1998 |
| EP | 0919964 | 6/1999 |
| EP | 0959570 | 11/1999 |

(56) References Cited

FOREIGN PATENT DOCUMENTS

| | | |
|---|---|---|
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 07-311587 | 11/1995 |
| JP | 08-279235 | 10/1996 |
| JP | 8274812 | 10/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2000-270314 | 9/2000 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2004-030469 | 1/2004 |
| JP | 2004-054435 | 2/2004 |
| JP | 2005-018438 | 1/2005 |
| JP | 2005-107267 | 4/2005 |
| JP | 2005-184237 | 7/2005 |
| JP | 2005-215209 | 8/2005 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-199775 | 8/2007 |
| JP | 2007-241748 | 9/2007 |
| JP | 2008-058656 | 3/2008 |
| JP | 2009-017529 | 1/2009 |
| JP | 2009-075540 | 4/2009 |
| JP | 2009-288702 | 12/2009 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 93/021732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 03/069613 | 8/2003 |
| WO | WO 2004/029775 | 4/2004 |
| WO | 2005/026916 | 3/2005 |
| WO | WO 2005/052751 A2 | 6/2005 |
| WO | WO 2006/014739 | 2/2006 |
| WO | WO 2006/056933 | 6/2006 |
| WO | WO 2007/069143 A2 | 6/2007 |
| WO | WO 2007/092542 | 8/2007 |
| WO | WO 2008-033853 | 3/2008 |
| WO | WO 2009/004531 A1 | 1/2009 |
| WO | WO 2011094330 | 8/2011 |
| WO | WO 2013/040603 | 3/2013 |

OTHER PUBLICATIONS

European Examination Report dated Aug. 17, 2016 in European Appln No. 12 075 107.8.
Office Action in related U.S. Appl. No. 12/929,466 dated Apr. 14, 2016.
Office Action in related U.S. Appl. No. 11/902,658 mailed Jun. 29, 2016.
Examiner's Report in related Canadian Application No. 2,881,503 dated Mar. 17, 2016.
"About Ecast", date unknown, leaflet.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
Drews, C.; Pestoni, F.; "Virtual jukebox: reviving a classic," Proceedings of the 35th Annual Hawaii International Conference System Sciences, pp. 887-893, Jan. 7-10, 2002.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.

(56) References Cited

OTHER PUBLICATIONS

Gallardo et al., "Tangible Jukebox: back to palpable music", ACM TEI, pp. 199-202, 2010.
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
IBM Technical Disclosure Bulletin, vol. 41, No. 1, Jan. 1998, "Safe Mechanism for Installing Operating System Updates with Applications," pp. 557-559.
Johnny Rockets Name That Tune [online], [retrieved Mar. 7, 2002]. Retrieved from the Internet: <http://www.johnnyrockets.com/docs/funstuff.html>.
Kraiss et al., "Integrated document caching and prefetching in storage hierarchies based on Markov chain predictions", The VLDB Journal, vol. 7, issue 3, pp. 141-162, 1998.
Ludescher et al., "File Storage Management for TFTF physics data", IEEE, pp. 856-859, 1992.
Merriam Webster's Collegiate Dictionary, Tenth Edition, Merriam-Webster, Inc., p. 361 (definition of dynamically).
Mickey B's Jukebox Revue—Name That Tune! [online], [retrieved Jul. 23, 2001]. Retrieved from the Internet: <http://mickeyb.com/tune/>.
Peter Pawlowski, "Basic Player Whose Appearance and Functions can be Customized Freely 'Foobar 2000' v1.0 is Unveiled," Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Sprague et al., "Music selection using the partyvote democratic Jukebox", ACM AVI, pp. 433-436, 2008.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox A semi public device for presenting multimedia information content", Pers. Ubiquit Comput, 7, pp. 217-220, 2003.
Tom & Liz's Name That Tune [online], [retrieved Jul. 23, 2001]. Retrieved from the Internet: <http://home.att.net/~tomnliz/Music.html>.
Yuki Murata, iTunes no 'Kankyo Settei' Catalog & Tips 10 Sen, Mac People, ASCII Corporation, Oct. 1, 2007.
"Darts Revolution Again", Replay Magazine, Mar. 1991, pp. 146-148.
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Bonczek et al, "The DSS Development System", 1983 National Computer Conference, Anaheim, California, May 16-19, 1983, pp. 441-455.
Derfler et al., "How Networks Work", Millennium Ed., Que Corporation, Jan. 2000.
European Search Report from EP 1 993 079.
European Search Report issued for European Application No. 08000845.1-1238/1962251, dated Apr. 3, 2009.
Gralla, "How the Internet Works", Millennium Ed., Que Corporation, Aug. 1999.
Grimes, Chapter 18, "Taking Advantage of Web-based Audio".
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
ITouch 27 New Games brochure, JVL Corporation, 2005, 2 pages.
ITouch 8 Plus brochure, JVL Corporation, 2005, 2 pages.
Koskelainem, "Report on Streamworks ™M".
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 Oct. 1 JP 07 281682, figure 1-6 abrége.
Schneier, "Applied Cryptography", Second Edition, John Wiley & Sons, Inc. New York, 1996.
Stevens, "TCP/IP Illustrated: vol. 1, the Protocols".
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).

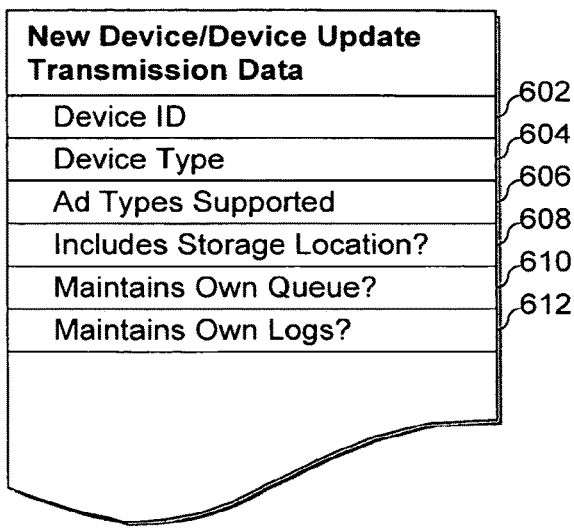
Fig. 6
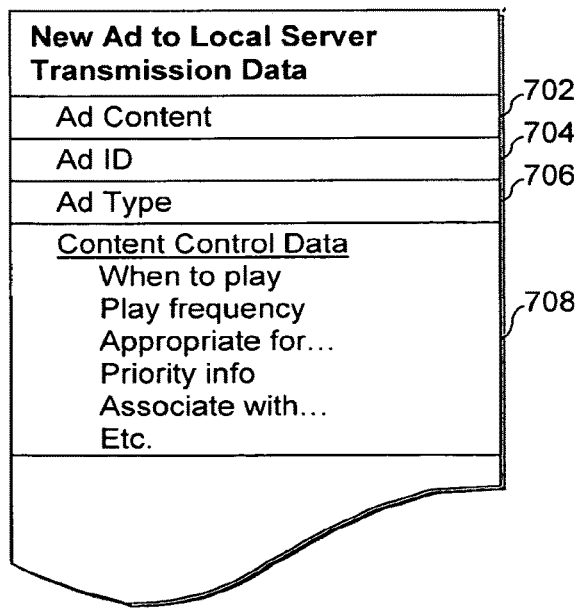
Fig. 7
Fig. 8

SYSTEMS AND/OR METHODS FOR DISTRIBUTING ADVERTISEMENTS FROM A CENTRAL ADVERTISEMENT NETWORK TO A PERIPHERAL DEVICE VIA A LOCAL ADVERTISEMENT SERVER

CROSS-REFERENCE TO RELATED APPLICATION

This application is a continuation of application Ser. No. 17/011,719 filed Sep. 3, 2020, which is a continuation of application Ser. No. 15/959,889 filed Apr. 23, 2018 which is a continuation of application Ser. No. 14/277,404 filed May 14, 2014, now U.S. Pat. No. 9,953,341 filed Apr. 24, 2018, which is a continuation of application Ser. No. 13/670,553 filed Nov. 7, 2012, now U.S. Pat. No. 8,739,206, which is a continuation of application Ser. No. 12/318,864 filed Jan. 9, 2009, now U.S. Pat. No. 8,332,887, which claims the benefit of Provisional Application No. 61/006,382 filed Jan. 10, 2008, the entire contents of each of which are hereby incorporated by reference in this application.

TECHNICAL FIELD

The exemplary embodiments disclosed herein relate to systems and/or methods for distributing advertisements to one or more peripheral devices. More particularly, certain exemplary embodiments relate to systems and/or methods for distributing advertisements from a central advertisement network to one or more peripheral devices at a location via a local advertisement server. In certain exemplary embodiments, the local advertisement server within a location receives advertisements from the central advertisement network and rebroadcasts them to peripheral devices within that location. Advertising information may be tracked and reported, e.g., for accounting, revenue-sharing, and/or other purposes in certain exemplary embodiments.

BACKGROUND AND SUMMARY

Various advertising schemes have been developed over the years. For example, an early advertising scheme still used today involves printing advertisements and recording information about the "impressions." Impression information tends to reflect the subject matter of the advertisement, the general audience targeted, the location where printed, etc. Another common advertising scheme involves inserting commercials into television programming. Again, "impressions" about the advertisement are recorded. An advertising technique that has gained prominence in the Internet age has been banner and pop-up type advertisements. Impressions may be recorded, e.g., in the form of cookies or the like, and sometimes may be reported back to a local server. Based on these and/or other information, including demographic, taste, shopping habit, and/or other comparisons, it has sometimes been possible to attempt to more precisely target advertisements to users.

Unfortunately, such advertising techniques suffer several disadvantages. For example, it often is difficult to accurately record impression information for printed advertisements and television commercials. Although it is possible to get an idea about the broad area and/or audience covered, the time of day a spot was run, and general demographic information about neighborhoods and/or television viewers, it is difficult to capture more detailed and/or more precise impression information. Banner and pop-up ads are able to gather more information about a user and/or a user's computer. However, the information still may be limited based on privacy settings set by the user and/or technical challenges related to the network-based connections. Moreover, such advertisements typically are limited to exposure on a personal computer.

There are also problems associated with the effect of advertisements on users. Oftentimes, printed advertisements are simply discarded. Television commercials increasingly are being ignored or completely skipped (e.g., through the proliferation of digital video recorders and "TV on DVD" style offerings). More recently, banner and pop-up ads tend to be viewed as intrusive and a violation of privacy. Accordingly, numerous attempts have been made to try to filter or reduce the appearance of banner and pop-up ads on computers. Unsolicited email messages have been labeled "spam," are subject to email client filters, and even have been the subject of several bills sponsored in both houses of the U.S. Congress.

In view of the above, a further problem exists in that although digital advertisement distribution techniques present a better chance of reaching potential customers in new and engaging ways while also allowing advertisers to gather more detailed impression information, they tend to be subject to more criticism and to technology-based filtering.

Therefore, it will be appreciated that there is a need in the art for improved digital advertisement distribution techniques. It also will be appreciated that there is a need in the art for systems and/or methods for distributing advertisements from a central advertisement network to one or more peripheral devices at a location via a local advertisement server.

One aspect of certain exemplary embodiments disclosed herein relates to a local advertisement server located in an out-of-home (OOH) location and connected to a central advertising network being configured to cause advertisements to be displayed on a peripheral device.

Another aspect of certain exemplary embodiments relates to a peripheral device for use in an out-of-home location configured to display ads from a local advertisement server connected to a central advertising network.

Still another aspect of certain exemplary embodiments relates to a method of displaying advertisements on a peripheral device connected to a local server in an out-of-home location.

Yet another aspect of certain exemplary embodiments relates to an advertising system including a local advertisement server, the local advertisement server being located in an out-of-home location and being connected to a central advertising network such that it is configured to cause advertisements to be displayed on a peripheral device.

In certain exemplary embodiments, a local advertisement server is provided. A network connection to a central advertising network located remote from the local advertisement server is provided. A storage location is configured to store an advertisement database, with the advertisement database including advertisements received from the central advertising network via the network connection along with content control data associated with each said advertisement. A local connection to one or more peripheral devices located in the same location as the local advertisement server is provided. A display controller is configured to cause the one or more peripheral devices connected to the local advertisement server via the local connection to display at least some of the advertisements received from the central advertising network in dependence on the content control data associated with the advertisements.

In certain exemplary embodiments, an advertisement system or network comprising a plurality of such local advertisement servers is provided, with each said local advertisement server being located at a different location.

In certain exemplary embodiments, an advertising method for providing a plurality of electronic advertisements to peripheral display devices distributed across a plurality of locations is provided. A plurality of local advertisement servers are provided, with each said local advertisement server being located at a different location. A central advertising network located remote from the local advertisement servers is provided. At least some electronic advertisements are distributed from the central advertising network to the local advertisement servers via network connections provided to the respective local advertisement servers. Advertisement databases are stored via storage locations provided to the respective local advertisement servers, with the advertisement databases including electronic advertisements received from the central advertising network via the respective network connection along with content control data associated with each said electronic advertisement. At each said local advertisement server, at least one advertisement queue is maintained. Each said local server further comprises a display controller configured to cause any peripheral display devices connected thereto to display at least some of the electronic advertisements received from the central advertising network in dependence on the content control data associated with the electronic advertisements and the respective at least one advertisement queue. Each said electronic advertisement is one of a leader board, banner, or media clip. The content control data for each electronic advertisement comprises indications of how and when the associated electronic advertisement should be displayed.

These aspects and exemplary embodiments may be used separately and/or applied in various combinations to achieve yet further embodiments of this invention. Additionally, the exemplary embodiments described herein may be implemented as any suitable combination of programmed logic circuitry (e.g., as any suitable combination of hardware, software, firmware, and/or the like). In certain exemplary embodiments, computer readable storage mediums also may be provided.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 6 shows illustrative transmission data associated with a new device being connected to a local ad server or an already connected device being updated, in accordance with an exemplary embodiment;

FIG. 7 shows illustrative transmission data associated with a new ad being sent from the central advertisement network to a local server, in accordance with an exemplary embodiment;

FIG. 8 shows illustrative reporting data that may be sent from a local server to the central advertisement network, in accordance with an exemplary embodiment;

DETAILED DESCRIPTION OF EXEMPLARY EMBODIMENTS

Certain exemplary embodiments disclosed herein relate to systems and/or methods for distributing advertisements from a central advertisement network to one or more peripheral devices at a location via a local advertisement server. In certain exemplary embodiments, a local advertisement server within a location receives advertisements from the central advertisement network and rebroadcasts them to peripheral devices within that location. Advertising information may be tracked and reported, e.g., for accounting, revenue-sharing, and/or other purposes in certain exemplary embodiments. Thus, in certain exemplary embodiments, the distribution of advertisements is provided to peripherals via a non-web- and non-PC-dependent network. Moreover, in certain exemplary embodiments, reporting and advertising related communications are substantially bi-directional regardless of device type. This, it is possible in certain exemplary embodiments to record "impressions" of digital advertisements, including information such as, for example, when the advertisement was "printed," where the advertisement was "printed," who saw the advertisement, etc. It is also possible in certain exemplary embodiments to provide revenue sharing among some or all of the central advertising network provider, the proprietors of locations, operators tasked with maintaining the local ad server and/or the peripheral devices, etc.

1. Exemplary System Components

This section provides an overview of exemplary system components that may be used in connection with certain exemplary embodiments. For example, this section provides an overview of the overall advertisement distribution system, local ad servers, and peripheral devices. Of course, it will be appreciated that the following descriptions are provided by way of example and without limitation. Thus, for example, other techniques apart from those described herein may be used in connection with the exemplary embodiments described herein, as may various combinations and subcombinations of the exemplary techniques described herein.

1.1 Exemplary System Overview

Figure 1:
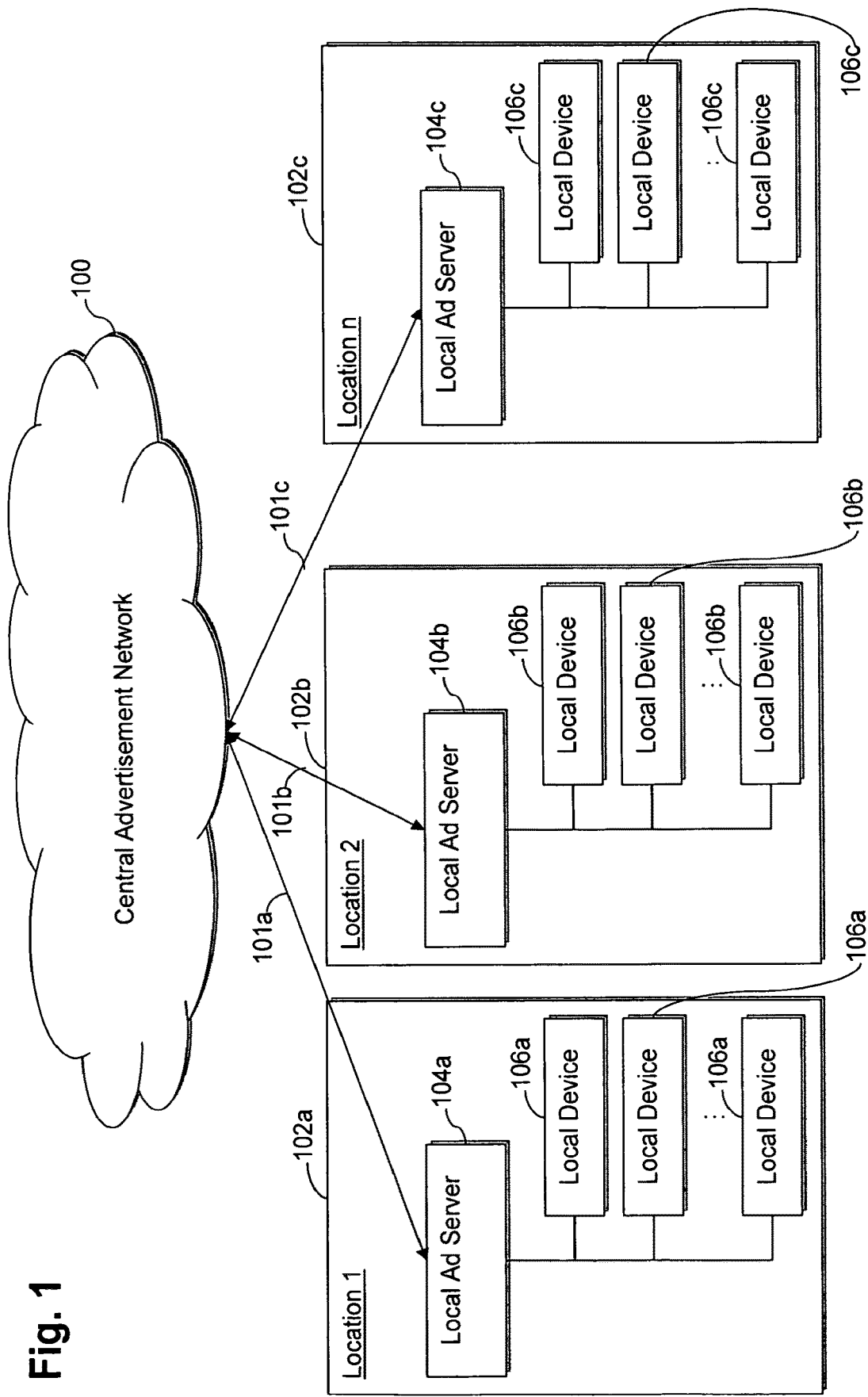
FIG. 1 is an illustrative simplified system view of a central advertisement network in connection with a plurality of local ad servers respectively located at a plurality of locations, in accordance with an exemplary embodiment.

Referring now more particularly to the drawings, FIG. 1 is an illustrative simplified system view of a central advertisement network in connection with a plurality of local ad servers respectively located at a plurality of locations, in accordance with an exemplary embodiment. The central advertisement network 100 is connected to the local ad servers 104a-c, which are respectively located at locations 102a-c, via a plurality of respective connections 101a-c. The connections 101a-c may be, for example, Internet connections, WAN connections, etc. The central advertisement network 100 includes a database (not shown) of advertisements that are distributable to the local ad servers 104a-c at the locations 102a-c. The advertisements stored in the database of advertisements may be categorized in various ways. For example, the advertisements may be categorized by product and/or service type; the type of advertisement (e.g., a leader board, banner, media clip, audio clip, video clip, etc.); the devices on which the ad should be displayed (e.g., only on televisions, only on jukeboxes, only for registered users, on handheld gaming machines and countertop boxes but not televisions, etc.), and/or in other ways.

The central advertisement network 100 also is configured to receive reporting information from the local ad servers 104a-c providing, for example, information related to the respective locations 102a-c, the advertisements shown, etc. Based on this information features such as revenue sharing, advertisement targeting, etc., may be provided. Further details of the reporting between the local ad servers 104a-c and the central advertisement network 100 will be provided in further detail below.

1.2 Exemplary Local Advertisement Server

Figure 2:
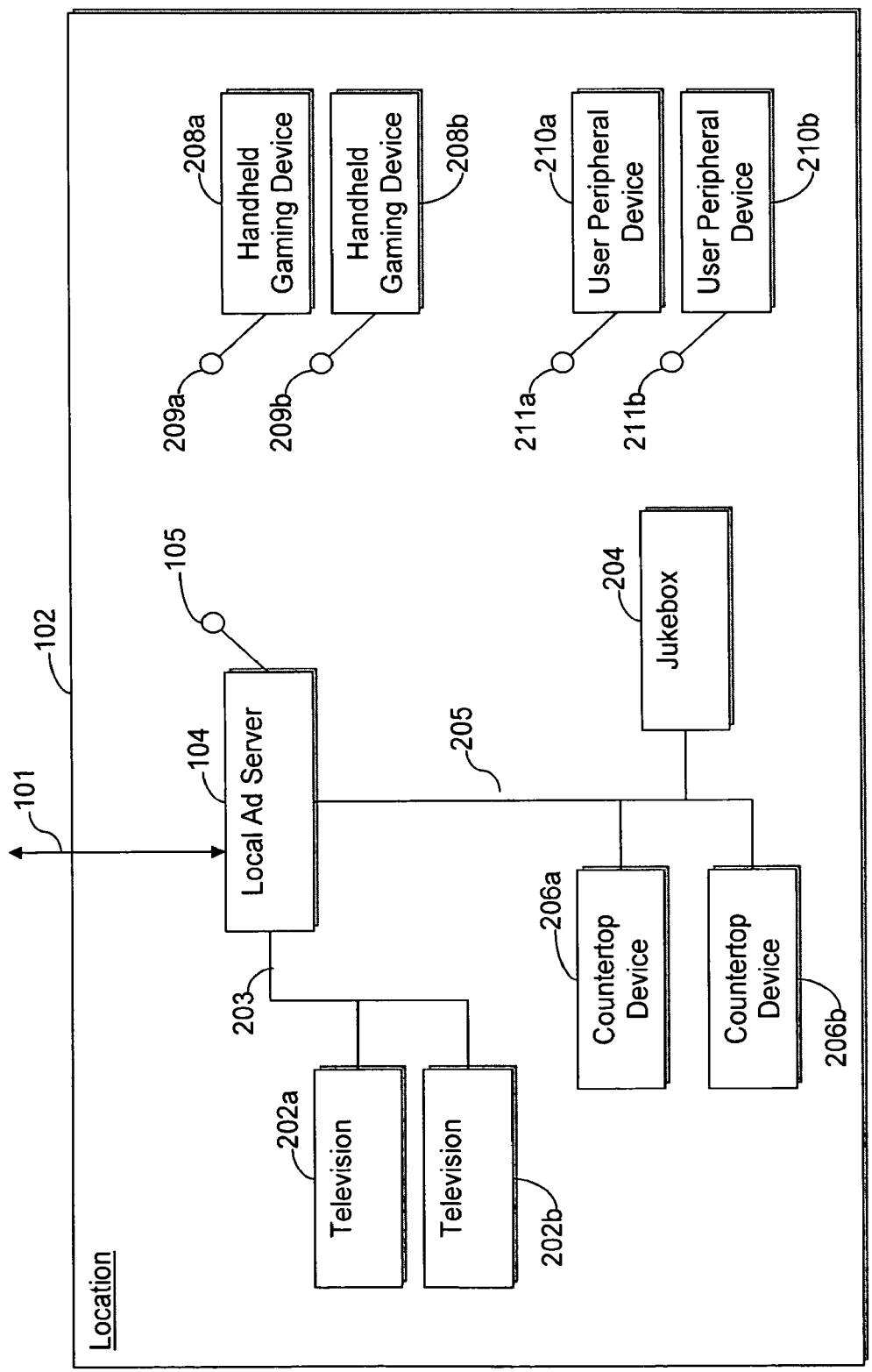
FIG. 2 is an illustrative simplified view of a location including a local ad server and a plurality of devices to which ads from the ad server will be distributed, in accordance with an exemplary embodiment.

Within each location 102, a local ad server is configured to communicate with a plurality of local devices 106 operably connected thereto. Thus, in general, a local ad server 104 is configured to receive advertisements from the central advertisement network 100 and is further configured to cause such advertisements to be displayed on one or more local devices 106 operably connected thereto. FIG. 2 is an illustrative simplified view of a location including a local ad server and a plurality of devices to which ads from the ad server will be distributed, in accordance with an exemplary embodiment. As noted above, there is a connection 101 from the central advertisement network 100 to the local ad server 104 in the location 102. Within the location 102, the local ad server 104 may be connected to the local devices on which the advertisements are to be displayed in any appropriate manner. As shown in FIG. 2, the local devices (also sometimes called peripheral devices) include televisions 202a-b, a jukebox 204, countertop devices 206a-b (e.g., bar-top game devices, jukebox terminals, and/or the like), handheld gaming devices 208a-b, and user peripheral devices 210a-b (e.g., laptops, mobile phones, PDAs, and/or the like). Of course, other peripheral devices may be operably connected to the local ad server 104. In certain example implementations, the local ad server 104 is connected to the televisions 202a-b via a wired connection 203, which may be, for example, a composite audio/video, component audio/video, coax, HDMI, S-video, F-pin, and/or any other suitable type connection. In certain example implementations, the local ad server 104 is connected to the jukebox 204 and the countertop devices 206a-b via a network connection 205 (e.g., an Ethernet network connection). In certain example implementations, the local ad server 104 may include a wireless transceiver 105, e.g., to communicate with wireless transceivers 209a-b of the handheld gaming devices 208a-b, respectively, and the wireless transceivers 211a-b of the user peripheral devices 210a-b, respectively. As will be described in greater detail below, the communications between the local ad server 104 and the peripheral devices within the location 102 may occur over a predefined protocol and/or may include one- or two-way transmission of data depending on the use case involved. It will be appreciated that other peripheral devices may be included in a location together with or in place of some or all of those shown in FIG. 2.

Figure 3:
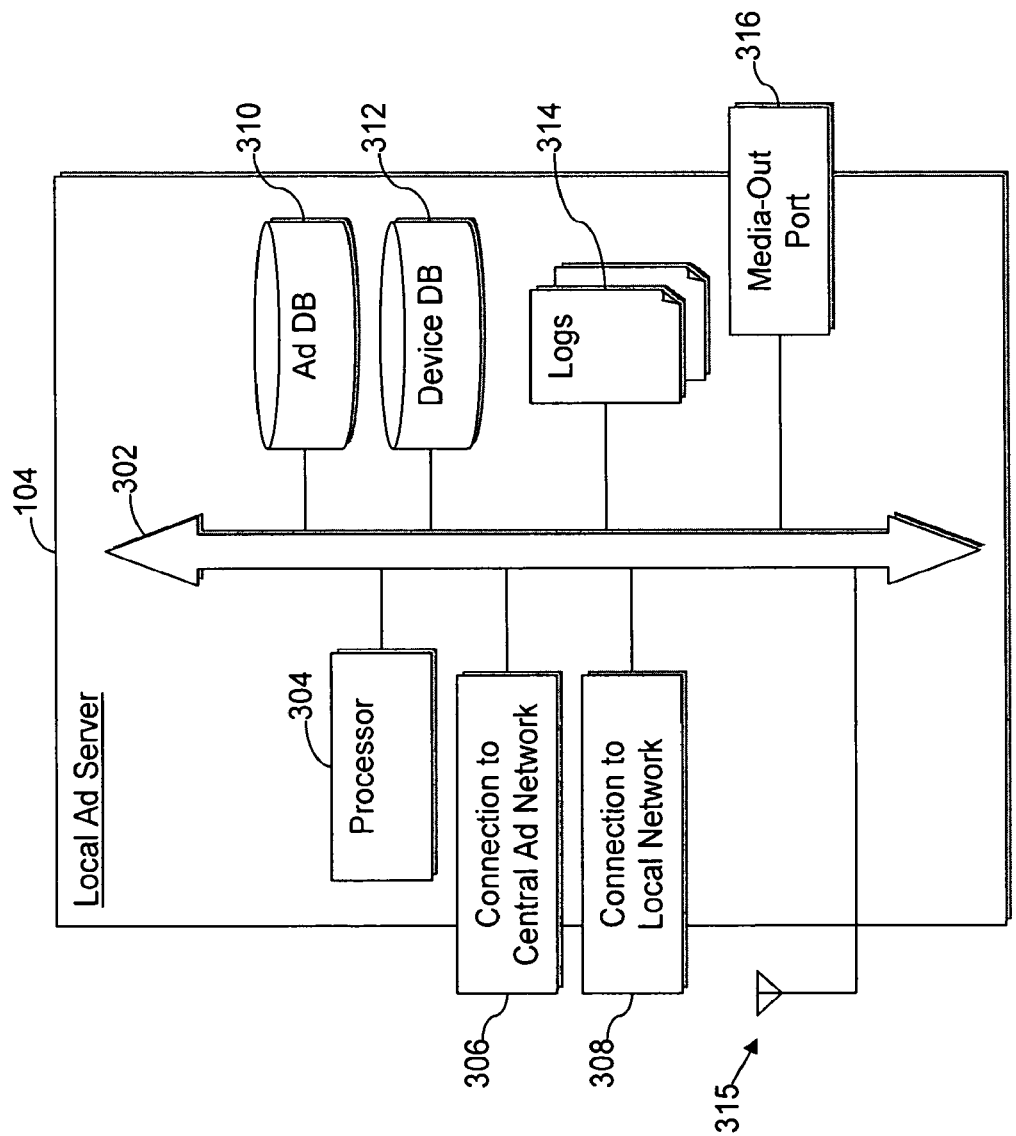
FIG. 3 is a simplified block diagram showing components comprising a local ad server, in accordance with an exemplary embodiment.

FIG. 3 is a simplified block diagram showing components comprising a local ad server, in accordance with an exemplary embodiment. A data bus 302 and a processor 304 facilitate the processing of data including, for example, the receiving of new advertisements from the central advertising network 100 via an advertising network connection 306, the causing of such advertisements to be displayed on the peripheral devices via a local network connection 308, etc. As noted earlier, the local network connection 308 may be an Ethernet connection or any other suitable connection (e.g., a LAN, WAN, wireless, infrared, dial-up, or other connection). Similarly, the advertising network connection 306 may be an Ethernet connection or any other suitable connection (e.g., a LAN, WAN, wireless, infrared, dial-up, or other connection). These connections therefore may facilitate the sending of information from the local ad server 104 to the central advertisement network 100 including, for example, information about the location, peripheral devices at the location, users frequenting and/or using the peripheral devices at the location, etc. Similarly, these connections may facilitate the sending of information from the local ad server 104 to the peripheral devices including, for example, the advertisements and associated data, log files, etc.

Advertisements sent from the central advertising network 100 and received by the local ad server 104 via the central ad network connection 306 may be stored in an advertisement database 310 or other suitable storage location of or associated with the local ad server 104 (e.g., on a disk drive device, flash media, USB device, in a memory location, etc.). Advertisements in the advertisement database 310 of the local ad server 104 may be in the form of, for example, leader boards, banners, audio/video media clips, audio clips, video clips, etc., and thus may be stored in any suitable format (e.g., as image files, moving GIFs, MPEG-2 or other format video files, Flash media, MP3 audio, etc.). In addition to the data file(s) corresponding to the advertisements, additional information associated with the advertisements also may be stored. For example, a unique identifier of the advertisement may be stored, as may the type or format of advertisement, and/or other content control data (e.g., when the ad should be played, how often it should be played, appropriate audience information, priority information, associations with particular songs, games, or web or television programming, etc.).

The local ad server 104 also may maintain a listing of connected devices, for example, in a device database 312 or other suitable storage location. Such a device database 312 may include all of the peripheral devices located in the particular location to which advertisements are to be distributed. It will be appreciated that certain types of peripheral devices may not be able to display certain types of advertisements. For example, a jukebox may be able to display audio and/or video advertisements, whereas a handheld gaming device may only be able to support banners and/or leader boards. Thus, along with such a listing of connected devices, information such as the types of advertisements displayable on the list may be displayed. Similarly, a peripheral devices may not include a dedicated storage location of its own for storing ads to be displayed, for maintaining queues of ads to be displayed, for maintaining log files, etc. For example, a television may not include its own storage location, whereas a user peripheral device may include its own storage location. Accordingly, such information may be stored in the device database 312 (e.g., as flags indicative of the corresponding features). Certain exemplary embodiments may, in turn, read and interpret such flags and accordingly maintain queues, log files, etc., on behalf of the particular devices incapable of maintaining their own queues, log files, etc.

As alluded to above, one or more log files 314 may be stored on the local ad server 104. A first type of log file may log information about communications between the central advertisement network 100 and the local ad server 104 related to the distribution of advertisements. For example, such a log file may log successful transmissions of advertisements from the central advertisement network 100 to the local ad server 104 along with a time/date stamp of the beginning and/or end of the transfer, and/or other information pertaining to such transfers. A second type of log file may log information about communications between the peripheral devices and the local ad server 104 related to advertisement-based reporting. Such log files may identify the advertisements played, the time of the playing, the device on which it was played, any events associated with the play (e.g., whether a song was playing, a television station was being shown, etc.), information about the particular customer using the device (e.g., when the user has registered, demographic information about the registered user may be logged, etc.), and/or the like. A third type of log file may log transmissions of the second type of log file (e.g., information related to advertisement-based reporting) between the local ad server 104 and the central advertisement network 100. Some or all of these log files 314 may be updated via the local ad server 104 or via the peripheral devices connected thereto.

It will be appreciated that the advertisement database 310, the device database 312, and/or the log files 314 may be encrypted. Such encryption may reduce the chances of a user tampering with the distribution of advertisements, reporting erroneous advertisement plays, etc. This may be advantageous in certain exemplary embodiments, for example, when revenue is shared based on advertising activities of the location, for accounting to advertisers, for ensuring that proper paid-for advertisements are not replaced with other unpaid-for advertisements, etc.

The local ad server 104 also may be connected to a media source 315. The media source 315 may be, for example, a television antenna, a cable or satellite connection, a DVD or other media player, etc. In such a case, the local ad server 104 may be configured to include advertisement material directly into the media stream from the media source 315. That is, the ad server 104 may add layers of advertisements (e.g., banners, leader boards, other advertisements) to the original media stream, may insert media content (e.g., video clips, pictures, slide shows, etc.) in the place of normal commercials included in the broadcast, may shrink or otherwise transform the media stream so as to add advertising content around the edges of the media stream, etc. An illustrative arrangement for the layering and/or insertion is described below, e.g., with reference to FIG. 5. A media-out port 316 may then distribute the modified content to the appropriate peripheral(s), e.g., via an Ethernet connection, a connection suitable for a television, etc.

Although not shown in FIG. 3, one or more queues of advertisements for display on the peripherals may be maintained by the local ad server 104. For example, one master queue may be maintained in certain exemplary embodiments such that advertisements are synchronized throughout all connected peripherals, e.g., causing all peripherals to display a common advertisement, a common advertisement type, common advertisement subject matter, different advertisements, advertisements are displayed in a round-robin format, etc. Multiple queues also may be maintained in certain exemplary embodiments, e.g., such that one queue is maintained for each peripheral device, one queue is maintained for each peripheral device type, etc. The peripherals may consult this queue or these queues when displaying advertisements, or the local ad server 104 itself may instruct the peripheral devices to display advertisements in accordance with the queue or queues.

Although the local ad server 104 has been described as relating to a separate component, it will be appreciated that a local ad server comprising programmed logic circuitry may be integrated into or included in another component, possibly even a peripheral device. Thus, in certain exemplary embodiments, a local ad server may be integrated into or included in, for example, a jukebox, a countertop device, etc. Indeed, the peripheral device itself may be used solely for advertisements, and/or for advertisements and/or another more conventional function (e.g., the peripheral devices may be used for purposes other than advertising in some cases). In such cases, the local ad server may be implemented as described herein, e.g., as any suitable combination of programmed logic circuitry including, for example, any suitable combination of hardware, software, firmware, and/or the like. The components may be shared with or separate from the underlying peripheral device. For example, a common storage location may be used, separate logical partitions of a common storage location may be used, or separate storage locations may be provided. Similarly, the same or different network connections may be provided (e.g., a single network connection in a jukebox, for example, may serve as a connection to an audiovisual distribution network and/or to the central advertisement network). Similarly, in certain exemplary embodiments, the same or different processors may be used. Furthermore, in certain exemplary embodiments where a local server is built into a digital jukebox device, the digital jukebox device may be configured to retrieve instances of media for playback via a central audiovisual network, with the central audiovisual network being the same network as the central advertising network.

1.3 Exemplary Peripheral Devices

A wide variety of peripheral devices may be used in connection with the ad servers of certain exemplary embodiments. For example, a peripheral device according to certain exemplary embodiments may include programmed logic circuitry (e.g., any suitable combination of hardware, software, firmware, and/or the like) for receiving advertisements from a local ad server and for displaying such advertisements. In such exemplary embodiments, the advertisement may be transmitted to the device and stored in a storage location or database and played back later, and/or streamed for substantially direct playback. The corresponding functionality may be included in the peripheral device directly (e.g., through the addition of a new software module or based on the original equipment manufacturer design). Such exemplary embodiments advantageously may be used in connection with, for example, countertop devices, jukeboxes, handheld gaming devices, etc.

In another example, a peripheral device according to certain exemplary embodiments may include programmed logic circuitry for interrupting the normal flow of content to insert advertisements from a local ad server. In such cases, an additional component may be provided to the display peripheral to interrupt the normal flow of media. For example, programmed logic circuitry may be interposed between a video display card and an actual display, e.g., to capture the video display signals generated by the video display card and to modify the signals so as to include the content accordingly before sending the modified signals to the actual display. Thus, it may be possible in certain exemplary embodiments to add layers, insert content, reformat displays, etc., in order to include custom advertising content from a local ad server. Such exemplary embodiments advantageously may be used in connection with, for example, countertop devices, jukeboxes, handheld gaming devices, televisions, etc.

In still other examples, e.g., in the case of a television or other unintelligent display, programmed logic circuitry may be provided to the peripheral to stream in and play back already modified content which may be, for example, content with custom advertisements inserted as commercials, as layers over the broadcast, etc. Thus, the normal flow of content will already be modified before reaching the peripheral device for playback.

In yet other examples, users using devices may be prompted to register themselves. Based on this information, ads may be displayed directly to the peripheral device. Thus, registered users may essentially "invite" advertisements, e.g., when viewing web pages, logging onto to the Internet from a particular location, playing a game at a location on a user's own device, etc. Moreover, by registering or at least by being identified (e.g., as a user on a jukebox, a player of a game on a countertop device, etc.), additional content in the form of advertisements may add to the expected user experience. The additional content may be, for example, customized advertisements (e.g., ads that incorporate personal information such as name and/or age, ads specifically targeted for an individual selected based on a model for example, ads for products or services a person is or seems to be interested in, etc.). The additional content also may be extra advertising content that ordinarily would not be expected. For example, pop-up advertisements, banners, movie clips, and/or the like may be displayed at a time when the user does not expect them to appear (e.g., when a user is selecting a song on a jukebox, in between levels of a game, in small windows of a handheld device, etc.). It is also possible to provide other types of additional advertising content to users, regardless of whether they are registered and/or identified.

Thus, it is possible to provide the advertising techniques of certain exemplary embodiments on both interactive and non-interactive peripherals. Moreover, as explained in greater detail below, interactive devices may enable further custom delivery of advertisements, e.g., to registered and/or tracked users.

Figure 4:
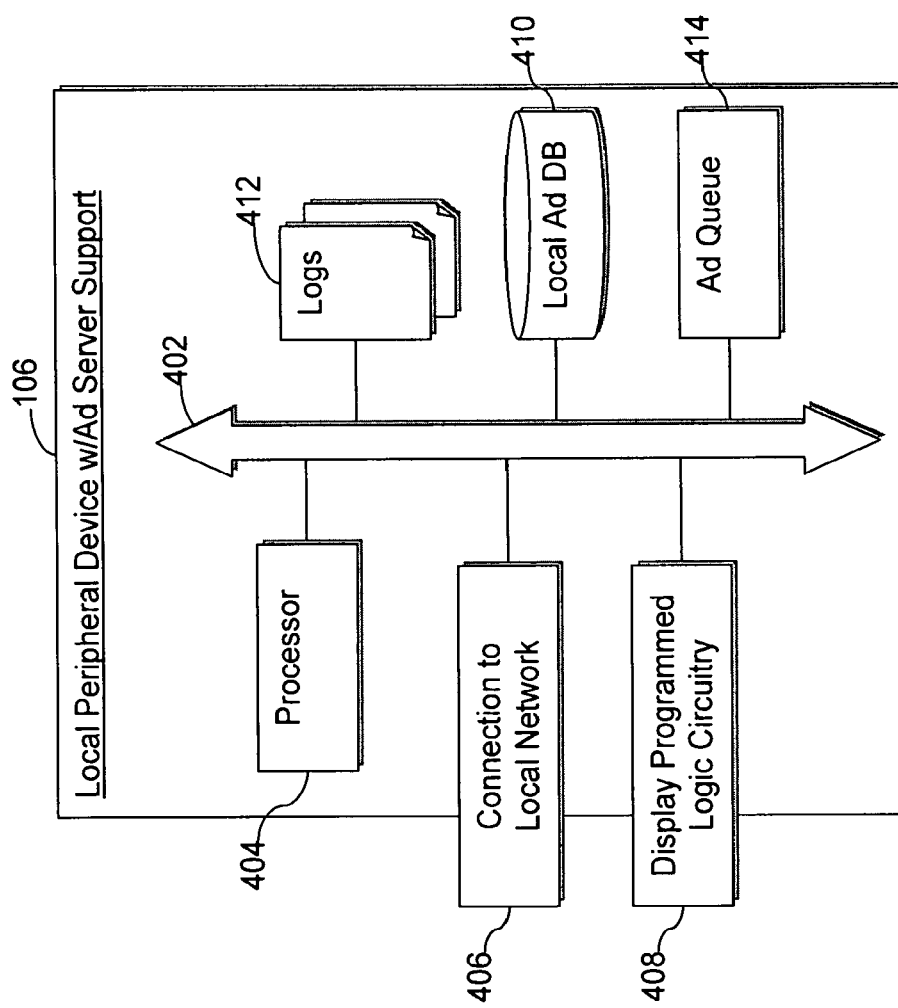
FIG. 4 is a simplified block diagram showing components comprising a device to which ads from the ad server will be distributed, in accordance with an exemplary embodiment.

FIG. 4 is a simplified block diagram showing components comprising a device to which ads from the ad server will be distributed, in accordance with an exemplary embodiment. A data bus 402 and a processor 404 facilitate the processing of data including, for example, the receiving of new advertisements from the local ad server 104 via an local network connection 406, the causing of such advertisements to be displayed on displays of the peripheral device 106, etc. As above, the local network connection 406 may be an Ethernet connection or any other suitable connection (e.g., a LAN, WAN, wireless, infrared, dial-up, or other connection).

The peripheral device with ad server support 106 may include a local advertisement database 410. The local advertisement database 410 may store advertisements to be displayed on the peripheral device 106 received from the local server 104. Information about when the ad should be displayed, the frequency for display, events that trigger the ad, etc., may be stored in the local advertisement database 410. An advertisement queue 414 may be included in the local advertisement database 410 or it may be a separate component.

The advertisement queue 414 may facilitate the ordering of advertisements for playback. It may be based on information associated with the advertisements stored in the local advertisement database 410, ultimately traceable back to the central advertisement network 100. The ordering may be based on, for example, the amount an advertiser has paid for the advertisement to be displayed, events triggering a particular advertisement (e.g., every time a particular song is played on a jukebox, an associated advertisement might be displayed), absolute times of days in which ads should be played (e.g., an advertisement may be setup for playback at a particular time every day or on certain days, etc.), and/or based on other factors. The advertisement queue 414 also may be organized as a playlist of advertisements. Such a playlist of advertisements may be integrated into or associated a playlist of instances of media, e.g., on a jukebox in certain exemplary embodiments. Advertisements also may be scheduled using the same or similar techniques, with such scheduling being accomplished by an advertiser, a proprietor of a location, etc.

One or more logs 412 may be kept and/or stored on the local peripheral device 106. A first type of log corresponds to data pertaining to updates from the local ad server. For example, the success or failure of a particular advertisement update may be stored, as may the particular advertisements updated, the date/time of the update, etc. A second type of log pertains to the actual playback of advertisements. For example, an identifier of the advertisement may be logged, along with the date/time of the playback, the number of playbacks, an event associated with the playback, etc.

A local ad server may be updatable remotely and/or in person. In the former case, remote downloads may be scheduled as described in greater detail below. In the latter case, updating may be done by a traveling operator, using, for example, a storage device such as a USB device, flash media, CD or DVD, etc. Similarly, the transmission of log files also be take place remotely and/or by a traveling operator. In general, then, transmissions (e.g., log file transmissions, advertisement updates, etc.) may be performed substantially in real-time, in batch at a scheduled or forced or other time (e.g., when a dial-up connection is used), in person, etc.

The local peripheral device 106 also may include display programmed logic circuitry 408. In certain exemplary embodiments, the display programmed logic circuitry 408 simply may integrate the advertisement to be played back into the normal content. For example, a webpage or video stream may be modified, a game screen may be reformatted, etc. In certain exemplary embodiments, the display programmed logic circuitry 408 may temporarily interrupt the normal flow of a stream to playback the advertisement, e.g., by replacing standard commercial content, by pausing a game or instance of media queued for playback on a device, etc. In still other exemplary embodiments, the display programmed logic circuitry 408 may be integrated into the peripheral device 106 such that the playback of advertisements is substantially seamless and integrated into the main content in a manner transparent to the user.

As alluded to above, peripheral devices may be used to provide interactions with advertisements. Thus, an advertisement may be changed based on user interaction with the peripheral device. In one exemplary implementation, a display on a suitably configured device may display an advertisement. The display may invite or prompt the user of the device or those capable of viewing the display to take an action, e.g., send a text message (e.g., an SMS message), email an address, select an area of the display, etc. The input may be processed by the local ad server directly or indirectly (e.g., input may be processed by the peripheral device and log files about the interaction may later be shared with the local ad server and/or the central advertising network) to bring about a particular result. The inputs to the advertisement may cause, for example, responders to be entered into a drawing or giveaway (e.g., a "text to win" scenario), free credits for plays on a jukebox to be dispensed (e.g., credited to a user account or directly to a user via a rewards card or other payment device, etc.), songs to be moved up in queue based on voting, various similar or different commercial products or services to be ranked (e.g., colas, beers, vacuums, etc.), discounts to be applied to products (e.g., that finish first in a voting contest), coupons to be dispensed, etc. In other words, the advertisements may be displayed in response to input provided, directly or indirectly, by a person to whom the electronic advertisements is targeted. The displayed advertisements themselves may be changed in dependence on the input. For example, advertisements for more highly ranked products may be displayed more often, popular advertisements may be displayed more frequently, etc.

Figure 5:
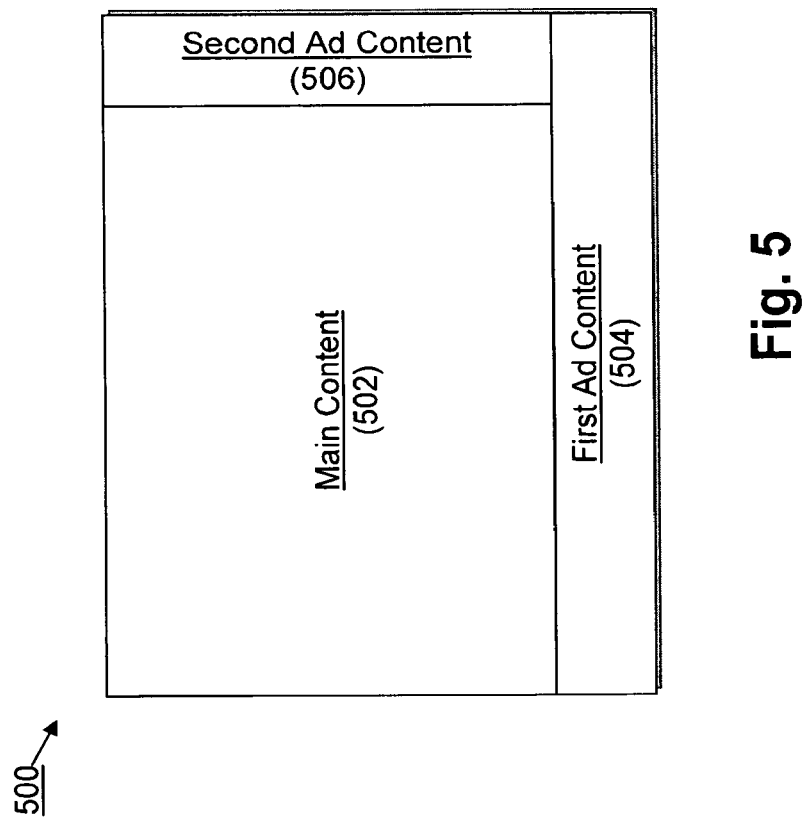
FIG. 5 is an illustrative display showing how advertising content may be included with main content, in accordance with an exemplary embodiment.

FIG. 5 is an illustrative display showing how advertising content may be included with main content, in accordance with an exemplary embodiment. Certain exemplary embodiments create a new display 500 that includes the main content 502 as well as advertising content. In the example shown in FIG. 5, first and second advertising content 504 and 506 are included in the new display 500. The first and second advertising content 504 and 506 may be added as layers over top of the main content 502 in certain exemplary embodiments, whereas the first and second advertising content 504 and 506 may be added around shrunken down main content 502 in certain other exemplary embodiments. It will be appreciated that the main content 502 may be reduced in one dimension so as to permit the addition of content in that dimension whereas other content may be overlaid onto existing content in another dimension. It also will be appreciated that although two advertising content sections are shown, the present invention is not limited to only two advertising content sections or the respective formats thereof. For example, in certain exemplary embodiments, a single advertising area may be substantially square-shaped and may be displayed opaquely or semi-transparently over some or all of the main content 502.

In certain exemplary embodiments, if a connection to the central advertisement network is temporarily lost or damaged, the local ad server may at least temporarily store information for later transmission. Similarly, if a connection between the peripherals and the local ad server is temporarily lost or damaged, the peripherals may at least temporarily store information for later transmission. This may occur before, during, and/or after real-time and/or scheduled transmissions of log files, and the central advertisement network, local ad server, and/or peripheral devices may anticipate such outages and/or respond to them in one or more of the techniques set forth herein and/or in other ways, e.g., to ensure that data is transmitted as appropriate. In a case where storage is not provided to a peripheral device, a peripheral device operably connected thereto may at least temporarily serve as a local ad server, serving advertisements and/or storing data. This may take place until the connection is repaired or reestablished. In this and/or other ways, certain exemplary embodiments provide a local ad server that it operable over a non-web-dependent and/or non-PC dependent network. Moreover, communications are substantially bi-directional regardless of device type, insofar as data may be logged and advertisements distributed in dependence on a central coordinating local ad server. Similarly, in certain example implementations, if the local ad server is damaged, one or more of the peripheral devices may be configured to communicate directly with the central advertisement network.

2. Exemplary Data Transmissions

This section provides examples of the types of information that may be included in communications between, for example, the central advertisement network 100 and the local ad server 104, and between a local ad server 104 and a peripheral device. More particularly, FIG. 6 shows illustrative transmission data associated with a new device being connected to a local ad server or an already connected device being updated, in accordance with an exemplary embodiment; FIG. 7 shows illustrative transmission data associated with a new ad being sent from the central advertisement network to a local server, in accordance with an exemplary embodiment; and FIG. 8 shows illustrative reporting data that may be sent from a local server to the central advertisement network, in accordance with an exemplary embodiment.

2.1 Illustrative New/Updated Device Transmission Data

Referring more particularly to FIG. 6, new device/device update transmission data 600 may be sent from a peripheral to a local ad server 104, and/or from a local ad server 104 once it has been received to the central advertisement network 100. A new peripheral connected in a suitably configured location may automatically (e.g., without direct user prompting) transmit such information in certain exemplary embodiments. In certain exemplary embodiments, a user may input such information into a local ad server 104, e.g., using a user interface provided thereto. The new device/device update transmission data 600 includes a device id 602, which uniquely identified the device that has been added to the location or has been updated (e.g., been upgraded to be able to process further advertisement types, communicate over a wireless connection instead of a wired connection, etc.). The device type 604 also is specified. The device type 604 may be indicative of a television, a jukebox, a countertop device (e.g., a bar-top game device, a jukebox terminal, and/or the like), a handheld gaming device, a user peripheral device (e.g., a laptop, a mobile phone, a PDA, and/or the like), etc. The ad types supported 606 also may be specified. In certain exemplary embodiments, this information may be at least partially populated automatically (e.g., as mobile phones are capable of supporting SMS messages, televisions are capable of supporting video playback, jukeboxes are capable of supporting audio content, etc.).

A flag for indicating whether the peripheral includes its own storage location 608 may be set to indicate whether advertisements may or should be sent to the peripherals, e.g., in advance of when they should be played back. If the flag 608 indicates that the peripheral includes its own storage location, content may be distributed, in whole or in part, to the peripheral some time before it is to be displayed. If the flag 608 indicates that the peripheral does not include its own storage location, the local ad server 104 may only distribute advertisements to the peripheral device when it is to be displayed (e.g., when a commercial is to be replaced, when a new banner is to be displayed on a webpage, etc.).

A flag for indicating whether the peripheral maintains its own queue 610 may be set to indicate whether the peripheral itself will or should maintain its own queue of advertisements. If the flag 610 indicates that the peripheral will maintain its own queue, the queue may be configured by the local ad server 104 once or periodically and left to the peripheral for actual real-time management. If the flag 610 indicates that the peripheral will not or should not maintain its own queue, a queue may be set up on the local ad server 104 itself, or the peripheral device may be tagged so that it controlled in accordance with a master queue maintained by the local ad server 104.

A flag for indicating whether the peripheral maintains its own logs 612 may be set to indicate whether the peripheral itself will or should maintain its own log files. If the flag 612 indicates that the peripheral will maintain its own logs, the peripheral will or should maintain its own logs and the local ad server 104 will periodically or aperiodically retrieve such logs. If the flag 612 indicates that the peripheral will not or should not maintain its own logs, the local ad server 104 will maintain log files on behalf of the peripheral device. This may require further communications between the peripheral device and the local ad server 104, or it may not if a queue is also maintained by the local ad server 104 rather than the peripheral device.

2.2 Illustrative New Advertisement Transmission Data

Referring more particularly to FIG. 7, a new advertisement data 700 may be sent from the central advertisement server 100 to a local ad server 104, and/or from a local ad server 104 to a peripheral device. The new advertisement data 700 may include the advertisement content 702 itself. The advertisement content 702 may be in any appropriate form, such as, for example, an image file, a moving GIF, an MPEG-2 or other format video file, Flash media, MP3 audio, etc. A unique advertisement id 704 may be included to help track plays and/or distribution of the associated advertisement. The advertisement type 706 (e.g., leader board, banner, media clip, audio clip, video clip, etc.) also may be stored. This information may help the local ad server 104 determine which advertisements may be displayed on the peripheral devices, for example, by enabling a comparison between the information from the new/updated device transmission data 600 and the ad type 706 included in the new advertisement transmission data 700. This may be accomplished by having the local ad server 104 filter and distribute advertisements based at least on advertisement type as appropriate, or by having the peripheral devices initiate requests for all suitable advertisement types.

The new advertisement transmission data 700 also may include content control data 708. Such content control data 708 may include information such as, for example, when the advertisement should be played (e.g., time of day, day of week, special events, special occasions, holidays, etc.), the frequency at which the advertisement should be played (e.g., no more than X times per hour or per day, etc.), the audience for which the advertisement is appropriate (e.g., sports or music enthusiasts, persons over the age of 18 or 21, certain targeted demographic populations, etc.), priority information (e.g., the advertisement may be ranked according to a numerical or other value and then inserted into a queue or scheduled for playback in dependence on the priority information, etc.), whether the advertisement is associated with a particular event or occasion (e.g., every time a touchdown is scored, at the top of every hour, whenever a bartender initiates a signal, etc.), and/or other similar information.

2.3 Illustrative Reporting Data

Referring more particularly to FIG. 8, reporting data 800 may be sent from a peripheral to a local ad server 104, and/or from a local ad server 104 to the central advertisement network 100. In certain exemplary embodiments, at least some of the reporting data 800 may be supplied by a peripheral device (e.g., data corresponding to the particular advertisements displayed), while some of the information may be provided by the local ad server 104 (e.g., data corresponding to the location, that may be irrelevant or unknown to the peripherals). In certain exemplary embodiments, the data form the peripheral devices may be included within or wrapped by data from the local ad server 104.

The reporting data 800 may include a location id 802 that uniquely identifies the location of the local ad server 104 and the peripheral devices. The location id 802 may be user specified or assigned, e.g., by the central advertisement network 100. Location demographic data 804 also may be included in the reporting data 800. The location demographic data 804 may include information about customers (e.g., average age or age range, racial makeup, typical composition, etc.), the type of venue (e.g., a bar, club, lounge, restaurant, hotel, etc.), the music played or television watched (which may be detailed or summary information from a jukebox or television), revenue information (e.g., how much the location has grossed or netted in a particular night, how much money is generated from or dedicated to advertising, etc.), and/or other information. The location demographic data 804 may be provided to the central advertisement network 100 only once, with every reporting transmission, periodically (e.g., once a week, month, year, etc.), when requested by the central advertisement network 100, when initiated by a user at the location (e.g., to signal a significant change in one or more categories), etc.

The reporting data 800 also may include detailed advertising data 806. The advertising data 806 may be grouped, e.g., by advertisement id, advertisement type, advertisement subject matter, etc.; it may be ordered, e.g., by date/time, by advertisement id, by advertisement subject matter, etc.; or it might not be so categorized or ordered. The advertising data 806 thus may include the advertisement id, as well as information as to when the advertisement was played (e.g., date/time, day of week, etc.), the device on which the advertisement was played, any content that was played when the advertisement was played (e.g., a song or television program, etc.), information about the customer (e.g., when the customer is registered), etc.

3. Illustrative Use Cases

This section provides information related to several common use cases that may arise during the operation of a local ad server. It will be appreciated that the following is provided by way of example and without limitation. For example, other use cases may arise, and/or the use cases specified below may be handled in similar and/or other ways.

3.1 Setting Up a New Location

Figure 9:
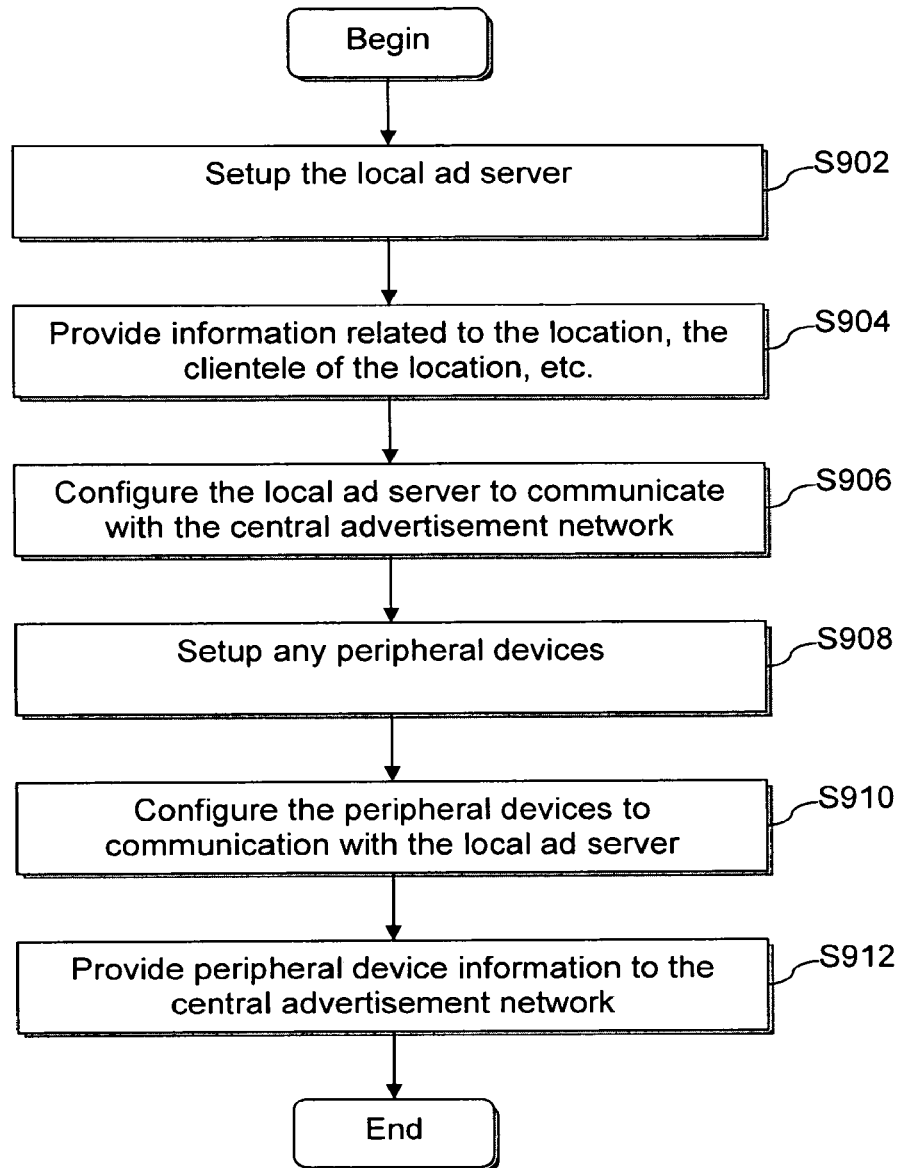
FIG. 9 is a flowchart showing an illustrative process for setting up a new location in accordance with an exemplary embodiment.

FIG. 9 is a flowchart showing an illustrative process for setting up a new location in accordance with an exemplary embodiment. In step S902, the local ad server is setup. In step S904, information related to the location, clientele of the location, etc., is provided, e.g., to a user interface provided to the local ad server. In step S906, the local ad server is configured to communicate with the central advertisement network. This may involve configuring firewalls, setting up proxy servers, specifying a common day/time for updates, etc. Any peripheral devices are setup in step S908. This may include installing programmed logic circuitry for use with the peripheral devices (e.g., to configure devices to communicate with the local ad server by, for example, installing a software module, providing a hardware module to interrupt the flow of content, etc.). The peripheral devices are then configured to communicate with the local ad server in step S910. This may involve configuring wireless connections, providing information about the peripheral devices to the local ad server, etc. In step S912, the peripheral device information is provided to the central advertisement network. The information provided in this use case may be updated as necessary, e.g., in accordance with the following use case.

3.2 Updating Information about a Location

Figure 10:
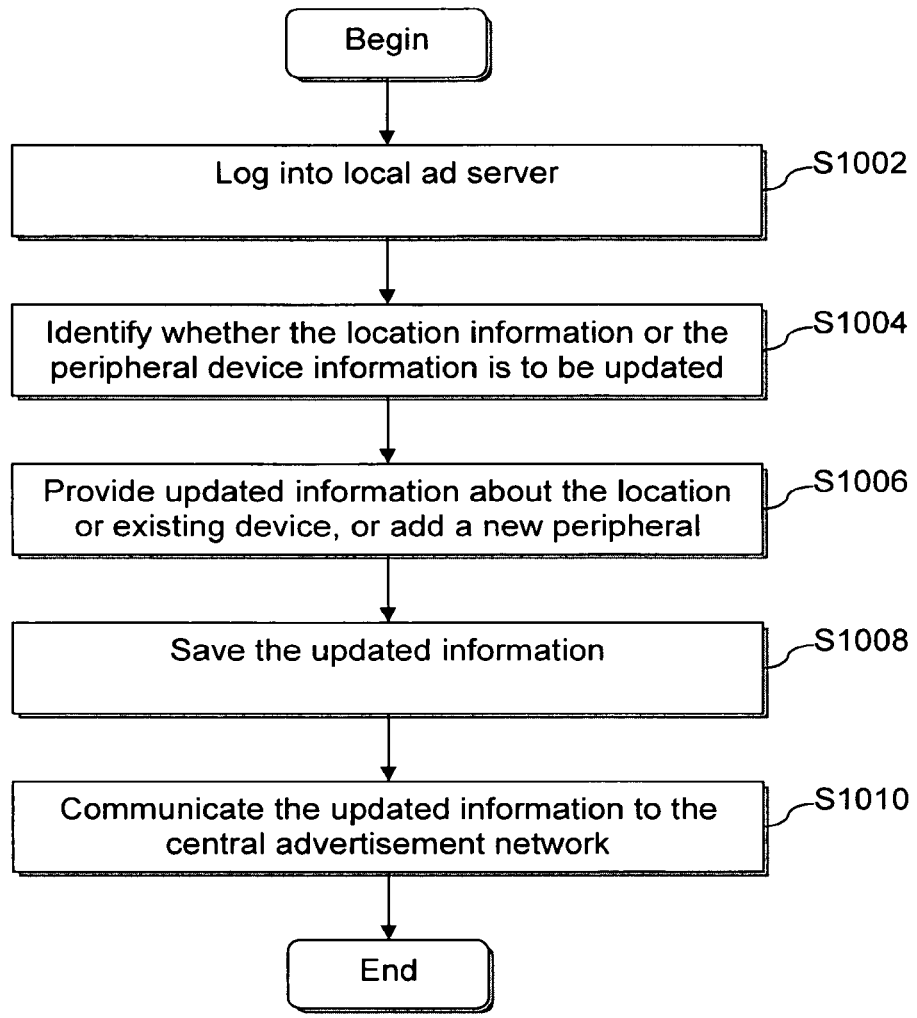
FIG. 10 is a flowchart showing an illustrative process for updating information about a location in accordance with an exemplary embodiment.

FIG. 10 is a flowchart showing an illustrative process for updating information about a location in accordance with an exemplary embodiment. In step S1002, the user logs into local ad server. In step S1004, the user identifies whether the location information or the peripheral device information is to be updated. In step S1006, the user provides updated information about the location or existing device, or adds a new peripheral. It will be appreciated that a new peripheral may need to be setup at or before this point. This updated information is saved in step S1008, and it is communicated to the central advertisement network in step S1010. Thus, the system is dynamic in that more or fewer devices may be added and/or changed once a location is initially configured.

3.3 Distributing Advertisements to a Location

Figure 11:
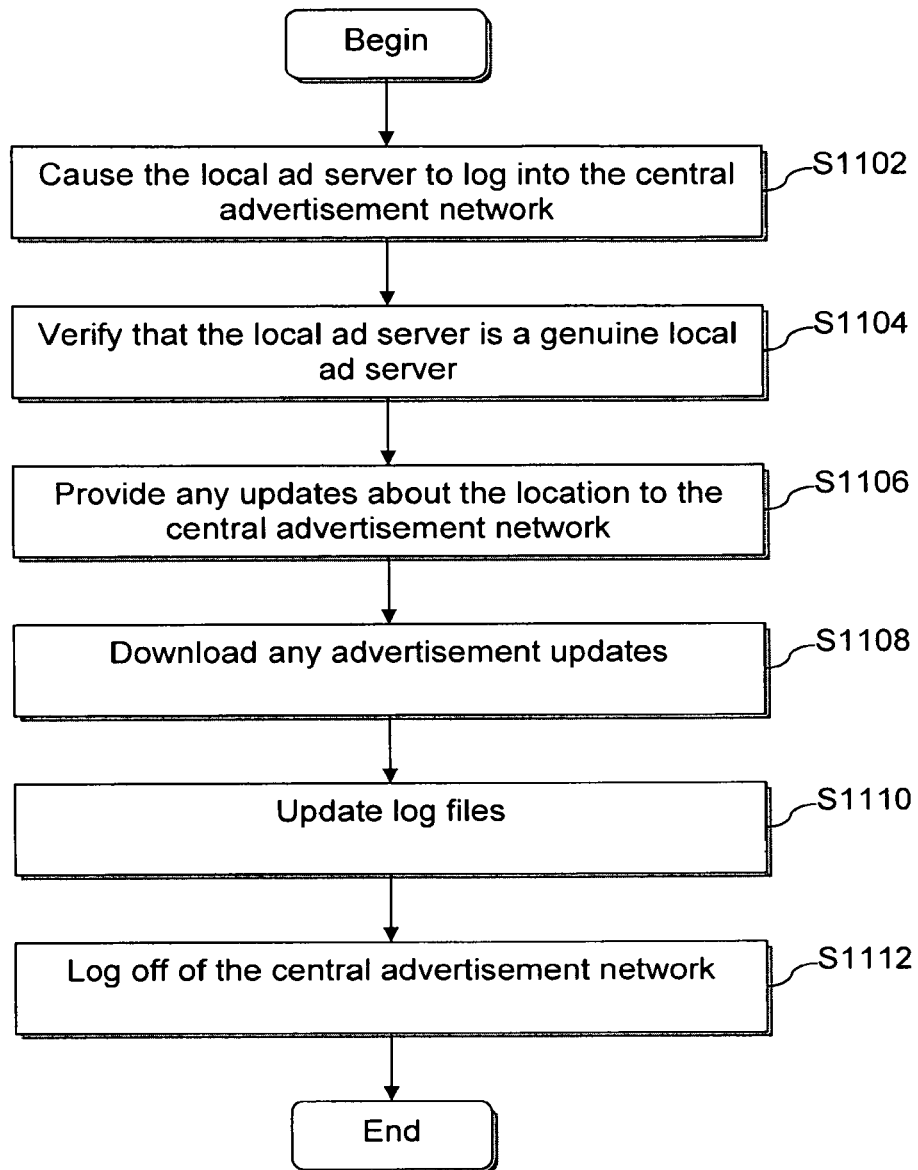
FIG. 11 is a flowchart showing an illustrative process for distributing advertisements to a location from a central advertisement network in accordance with an exemplary embodiment.

FIG. 11 is a flowchart showing an illustrative process for distributing advertisements to a location from a central advertisement network in accordance with an exemplary embodiment. In step S1102, the user causes the local ad server to log into the central advertisement network. In step S1104, the central advertisement network verifies that the local ad server is a genuine local ad server. This may be accomplished by checking the location id, by checking a username and/or password combination, etc. Any updates about the location are provided to the central advertisement network in step S1106. Any advertisement updates are downloaded in step S1108. This step may further comprising filtering a catalog of available advertisements based on, for example, the location demographics, device types at the location, advertisement types supported by the peripheral devices at the location, retrieving not previously downloaded or previously improperly retrieved (partial or corrupted) advertisements, etc. Log files are updated in step S1110, and the local ad server logs off of the central advertisement network in step S1112.

3.4 Distributing Advertisements to Peripheral Devices within a Location

Figure 12:
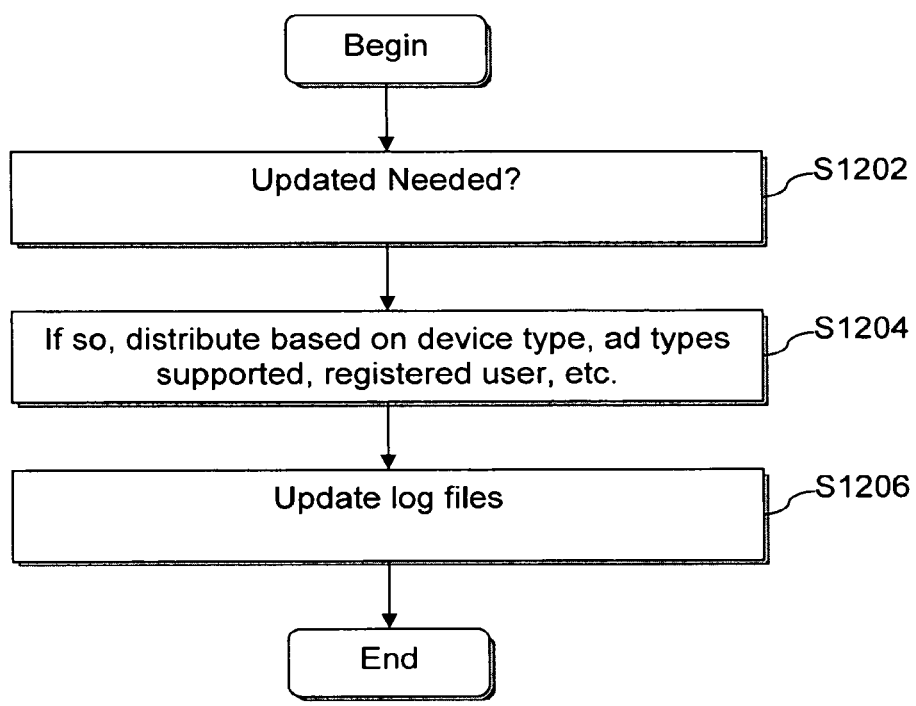
FIG. 12 is a flowchart showing an illustrative process for distributing advertisements from a local ad server at a location to peripheral devices in that location in accordance with an exemplary embodiment.

FIG. 12 is a flowchart showing an illustrative process for distributing advertisements from a local ad server at a location to peripheral devices in that location in accordance with an exemplary embodiment. In FIG. 12, it is determined whether an update to the peripheral devices is needed in step S1202. This may be initiated by the local ad server (e.g., as a push of new information), by the peripheral devices (e.g., as a pull of new information), in a according to a publish-and-subscribe behavior, at a particular predefined update time, based on a user trigger, etc. Updates may include advertisement updates, updates to the programmed logic circuitry (e.g., software updates, firmware upgrades, etc.), and/or the like. If there are updates, in step S1204, they are distributed to the peripherals based on, for example, device type, advertisement types supported, whether a user using a user peripheral device is a registered user, etc. Log files are updated in step S1206.

Additionally, a proprietor of a location may decide to filter advertisements per area of a location and/or type of device. For example, certain advertisements may be appropriate for a bar area of a hotel's restaurant, but inappropriate for the hotel's lobby. Similarly, devices of a particular kind may be configured to receive different ads than other devices. For example, more generally appealing and/or non-offensive advertisements may be displayed on large television displays viewable by a large number of persons, but handheld devices of a particular brand and/or that attract a certain demographic may be configured to receive a full panoply of different advertisements.

With respect to the registration of users, certain exemplary embodiments may maintain a database of registered users. Users may provide certain information (e.g., name, contact info, demographic info, etc.) to the location. In exchange, the user may be rewarded with credits, free plays, coupons, free drinks, promotional material, entry into a sweepstakes, etc. Advertisements may be further targeted to the registered user, e.g., based on the information provided by the user, when the user logs into a device (e.g., a jukebox, a handheld gaming device, the user's own laptop, etc.). Moreover, the profile of the registered user may be updated over time, for example, as the registered user initiates more plays on a jukebox, plays more games on a countertop device, etc.

3.5 Reporting Advertising Information to the Central Advertisement Network

Figure 13:
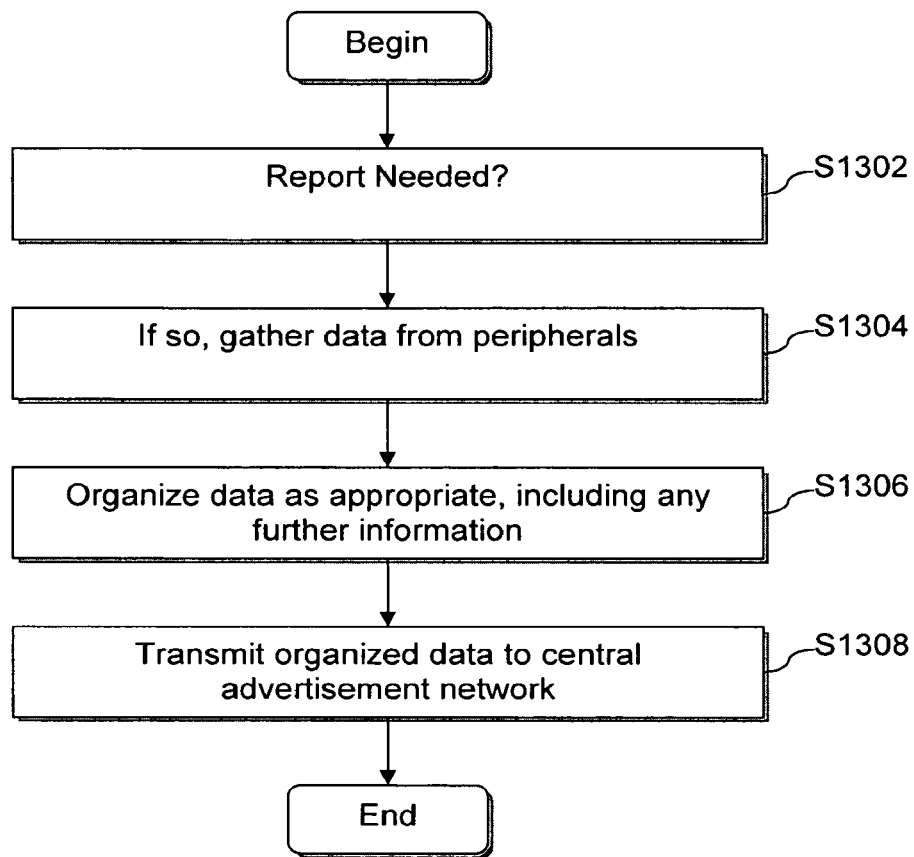
FIG. 13 is a flowchart showing an illustrative process for reporting data to the central advertisement network in accordance with an exemplary embodiment.

FIG. 13 is a flowchart showing an illustrative process for reporting data to the central advertisement network in accordance with an exemplary embodiment. In FIG. 13, it is determined whether a report to the central advertisement network is needed in step S1302. This may be initiated by the local ad server (e.g., as a push of new information), by the central advertisement network (e.g., as a pull of new information), in a according to a publish-and-subscribe behavior, at a particular predefined update time, based on a user trigger, etc. If a report is needed, in step S1304, data is gathered from the peripherals. The data gathered may include advertisement data (e.g., as described in connection with FIG. 8). The data from the peripherals may be organized into any predefined format, and additional information may be added by the local ad server (e.g., with updates about the location, etc.), in step S1306. The organized data may be transmitted to the central advertisement network in step S1308.

4. Exemplary Revenue Sharing Techniques

It is possible to implement revenue sharing in connection with certain exemplary embodiments. Advertisers pay for their advertisements to be distributed through the central advertisement network to a wide variety of locations. Revenue may be shared between one or more of the central advertisement network provider, the proprietor of the location, and any operators tasked with the maintenance of the local ad servers and/or the peripheral devices. The sharing of revenue may be based on predefined percentages (e.g., the central advertisement network provider earns a first percentage, the proprietor of the location earns a second percentage, and an operator earns a third percentage) or based on a formula or revenue sharing model. Such a revenue sharing model may take into account the number of advertisements shown (e.g., the more advertisements, the higher the percentage), the number of peripheral devices on which advertisements are shown (e.g., the more peripherals, the higher the percentage), the number of locations and/or peripherals managed by an operator (e.g., the more locations and/or peripherals, the higher the percentage), and/or the like.

The calculation of revenues may be facilitated by the logging of information and the transmission of such information to the central advertisement network. In particular, data may be logged to an accounting database in connection with the central advertisement network, and revenue sharing programmed logic circuitry in connection with the accounting database may interpret the stored data and calculate how much revenue should be shared among whom. This revenue sharing programmed logic circuitry may run at predefined intervals, on the occasion of predefined events, and/or when initiated by a user. For example, the revenue sharing programmed logic circuitry may calculate revenue shares once a day, once a month, every time the central advertisement network communicates with one or more local ad servers, when new advertisements are distributed, etc. Once it is determined how revenue should shared, the revenue may be disbursed (e.g., by direct deposit to a bank, by crediting an account, by sending a check, etc). The disbursement of revenues may be performed at a frequency the same as or different from the frequency at which the revenue sharing programmed logic circuitry is executed. Thus, the revenue sharing scheme may, for example, allow the central advertisement network provider, proprietors of locations, operators, and/or advertisers to share backend profits earned directly or indirectly based on an advertisement at a location.

A protocol may be implemented to track and provide rewards for such advertisements in certain exemplary embodiments. One known protocol already has been developed by Zoom Media, and it may be used in connection with certain exemplary embodiments.

Advertising on peripherals also may reduce the costs associated with purchasing and/or maintaining the peripherals, e.g., when such peripherals are allowed to operate in a "sponsored mode," or other mode where advertisements may be played along with the main content offering. In certain exemplary embodiments, it may be possible to turn on and off advertisements and to adjust the pricing or subsidizing of such peripherals in dependence on the amount of time the advertisements are on, the number of advertisements shown, the types of advertisements shown, etc.

Certain exemplary embodiments may provide a mechanism for advertisers to very precisely control the placements of their ads and/or where and how to make their "impressions." For example, proprietors of a location may provide very detailed information about their locations, including, for example, physical location (e.g., down to the intersection and/or address of a location), type of establishment (e.g., bar, restaurant, club, arcade, etc.), them of the establishment (e.g., hip-hop club, line dancing bar, Tex-Mex restaurant, etc.), type of music traditionally played (e.g., rock music, hipster scene, jazz club, etc.), and/or other information. Advertisers may define an advertising campaign, e.g., by defining rules as to where and/or how to advertise, may select locations individually or in groups, etc. For example, an advertising campaign may be setup within a geographic region, with a particular theme or type, combinations of the above and/or other features identified by a location, etc. To these and/or other ends, an advertiser interface may be configured to allow advertisers to define or redefine an advertising campaign by creating at least one rule specifying how and where an advertisement should be run. The advertiser interface may be accessible via the central advertising network.

The amount charged to the advertiser may be based on the campaign defined. The complexity of the campaign may help determine price (e.g., more complex campaigns cost more). Also, the number and/or type of the impressions also may help determine price. For example, based on actual historical and/or projected data about one or more selected locations, advertisements may be priced accordingly. The central advertisement network may predict a certain number of total impressions, which may sometimes be further broken down by type of advertisement, peripheral on which the advertisement was displayed, etc. The user may then be charged according to a fixed or sliding scale in dependence on the number of ads shown and/or predicted to be shown.

It will be appreciated that certain exemplary embodiments described herein may be implemented as programmed logic circuitry (e.g., any suitable combination of hardware, software, firmware, and/or the like). Also, the exemplary embodiments described herein, and/or components thereof, may be stored on a computer readable storage medium, e.g., as instructions. It will be appreciated that the aspects and exemplary embodiments may be used separately and/or applied in various combinations to achieve yet further embodiments of this invention.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A digital jukebox provided at a venue, the digital jukebox comprising:
    a local memory;
    a first communication interface configured to connect to a one or more remote computers including at least one central server;
    a second communication interface configured to connect to a plurality of display devices located at the venue and physically separate from the digital jukebox, the plurality of display devices including display devices of a first type and display devices of a second type;
    a display;
    audio output devices; and
    at least one processing circuitry configured to:
        receive, via the first communication interface, advertisements from the at least one central server and media selected accordingly for play back, wherein the advertisements and the media are selected by the central server according to the venue of the digital jukebox;
        play back, using the display and the audio output devices, said media and advertisements received from the at least one central server;
        selectively distribute at least some of the advertisements received from the at least one central server, to the plurality of the display devices connected to the digital jukebox through the second communication interface, the selectively distributing to display devices of the first type being different from the selectively distributing to display devices of the second type, wherein the selectively distributing includes distributing advertisements to display devices of the first type based at least on a device type of the display devices of the first type and distributing advertisements to display devices of the second type based at least on user information of users of the display devices of the second type.

2. The digital jukebox of claim 1, wherein the at least one processing circuitry is further configured to prompt said users to register themselves on the respective devices of the second type, and to perform the selectively distributing advertisements to display devices of the second type based on user information received in the registering by the users.

3. The digital jukebox of claim 2, wherein the selectively distributing includes: customizing one or more advertisements received from the at least one central server by incorporating user information received from a particular user registering on a display device of the second type; and distributing the one or more customized advertisements to the display device of the particular user.

4. The digital jukebox of claim 1, wherein the at least one processing circuitry is further configured to: cause display devices connected to the digital jukebox via the second communication interface that do not include their own other advertisement queues to display at least some of the advertisements received from the network based on the advertisement server advertisement queue and in dependence on content control data associated with those advertisements.

5. The digital jukebox of claim 1, wherein the at least one processing circuitry is further configured to:
configure in the local memory an advertisement server advertisement queue;
store the received advertisements in the advertisement server advertisement queue; and
for each of the plurality of display devices, configuring a respective indicator in the local memory indicating whether the display device maintains its own advertisement queue on the display device,
wherein selectively distributing includes distributing to other advertisement queues residing in, and usable by, multiple of the display devices based on respective capabilities thereof and based upon statuses of the respective indicators in the local memory indicating whether a corresponding one of the display devices maintains its own advertisement queue on the display device, each said other advertisement queue being programmed to aid the display device to which it is usable in displaying advertisements thereon in a manner that corresponds with content control data associated with the advertisements in the respective other advertisement queue.

6. The digital jukebox of claim 1, wherein each said advertisement is one of a leader board, banner, or media clip, and each media for play back includes at least a song.

7. The digital jukebox of claim 1, wherein the advertisements received from the at least one central server includes respective content control data, and the content control data for each advertisement comprises indications of how and when the associated advertisement is to be displayed.

8. The digital jukebox of claim 1, further comprising a non-volatile storage medium and stored thereon a plurality of log files including a first log file storing information regarding the distribution of advertisements from the at least one central server, and a second log file storing information regarding the display of advertisements on the display devices.

9. The digital jukebox of claim 1, further comprising a display controller, and the at least one processing circuitry in association with the display controller is further configured to combine, in a predetermined format, the advertisements with the media received from the at least one central server via the first communication interface to create a combined signal, the combined signal being transmittable to at least some of the display devices for possible subsequent display.

10. The digital jukebox of claim 9, wherein the advertisement server advertisement queue includes an advertisement queue for each of a plurality of different display device types, the display controller being further configured to cause display devices connected thereto via the second communication interface to display at least some of the received advertisements in dependence on the content control data associated with the advertisements and the associated advertisement queue.

11. The digital jukebox of claim 10, wherein the display controller is further configured to change or modify the advertisements being displayed in response to input provided, directly or indirectly, by a person to whom the advertisement is targeted.

12. The digital jukebox of claim 1, wherein the first type and the second type are different in a type of display device.

13. The digital jukebox of claim 1, wherein the first type and the second type are different in a type of a user.

14. A system comprising:
a first pay-for-play digital jukebox at a first venue;
a second pay-for-play digital jukebox at a second venue geographically different from the first venue;
one or more remote computers including at least one central server, and communicating with the first pay-for-play digital jukebox and the second pay-for-play digital jukebox,
wherein the first and second pay-for-play digital jukeboxes each comprises:
a local memory;
a first communication interface configured to connect to a one or more remote computers including the at least one central server;
a second communication interface configured to connect to a plurality of display devices located at the venue and physically separate from the digital jukebox, the plurality of display devices including display devices of a first type and display devices of a second type;
a display;
audio output devices; and
at least one processing circuitry configured to:
receive, via the first communication interface, advertisements from central advertisements server and media selected accordingly for play back, wherein the advertisements and the media are selected by the at least one central server in accordance with the venue of the first or second pay-for-play digital jukeboxes;
play back, using the display and the audio output devices, said media received from the at least one central server;
selectively distribute at least some of the advertisements received from the at least one central server, to the plurality of the display devices connected to the digital jukebox through the second communication interface, the selectively distributing to display devices of the first type being different from the selectively distributing to display devices of the second type, wherein the selectively distributing includes distributing advertisements to display devices of the first type based at least on a device type of the display devices of the first type and distributing advertisements to display devices of the second type based at least on user information of users of the display devices of the second type.

15. The system according to claim 14, wherein the at least one processing circuitry is further configured to prompt said users to register themselves on the respective devices of the second type, and to perform the selectively distributing advertisements to display devices of the second type based on user information received in the registering by the users.

16. The system according to claim 15, wherein the selectively distributing includes: customizing one or more advertisements received from the at least one central server by incorporating user information received from a particular user registering on a display device of the second type; and distributing the one or more customized advertisements to the display device of the particular user.

* * * * *